May 23, 1967     A. B. BASSOFF     3,320,821

FEED MECHANISM

Filed July 12, 1965     2 Sheets-Sheet 1

INVENTOR.
ARTHUR B. BASSOFF
BY Whittemore,
Hulbert & Belknap
ATTORNEYS

INVENTOR.
ARTHUR B. BASSOFF
BY Whittemore,
Hulbert & Belknap
ATTORNEYS

United States Patent Office 3,320,821
Patented May 23, 1967

3,320,821
FEED MECHANISM
Arthur B. Bassoff, Oak Park, Mich., assignor to National Broach & Machine Company, Detroit, Mich., a corporation of Michigan
Filed July 12, 1965, Ser. No. 471,059
9 Claims. (Cl. 74—110)

The present invention relates to feed mechanism and more particularly, to mechanism for effecting vertical feed of a machine tool component such for example as the head of a grinder.

It is an object of the present invention to provide feed mechanism including an inclined cam, a cam follower carried by the machine component which is to be fed, and means for effecting transverse movement of said inclined cam to effect corresponding movement of the machine component.

More specifically, it is an object of the present invention to provide feed mechanism for a machine tool comprising a horizontally movable cam having an inclined surface, a cam follower associated with said cam, and means for effecting horizontal movement of the cam to produce vertical movement of the cam follower.

Still more specifically, it is an object of the present invention to provide feed mechanism as described in the preceding paragraph including threaded means connected to the cam, and means for effecting incremental rotation of said threaded means to effect corresponding incremental transverse movement of said cam.

It is a further object of the present invention to provide cam feeding mechanism including a reciprocable cam, pawl and ratchet mechanism, and threaded means interposed between said pawl and ratchet mechanism and said cam for effecting intermittent movement of said cam.

It is a further object of the present invention to provide feeding mechanism including camming means, pawl and ratchet mechanism for effecting incremental movement of said camming means, and means for retaining the pawl of the pawl and ratchet mechanism out of engagement with the ratchet to provide for an uninterrupted continuous return movement of said cam to initial position following a predetermined number of incremental movements.

It is a further object of the present invention to provide feed mechanism including a cam, means for effecting intermittent movement of said cam including a rotatable threaded device, a plurality of pawl and ratchet mechanisms connected to said rotatable device, operation of any one of which in a feeding direction is effective to produce feeding movement of said cam, means for retaining the pawls of all of said pawl and ratchet mechanisms in inoperative position following a feeding stroke, and means for returning all of said ratchets to initial position following a predetermined number of feeding strokes.

Other objects and features of the invention will become apparent as the description proceeds, especially when taken in conjunction with the accompanying drawings, illustrating a preferred embodiment of the invention, wherein.

Figure 1:
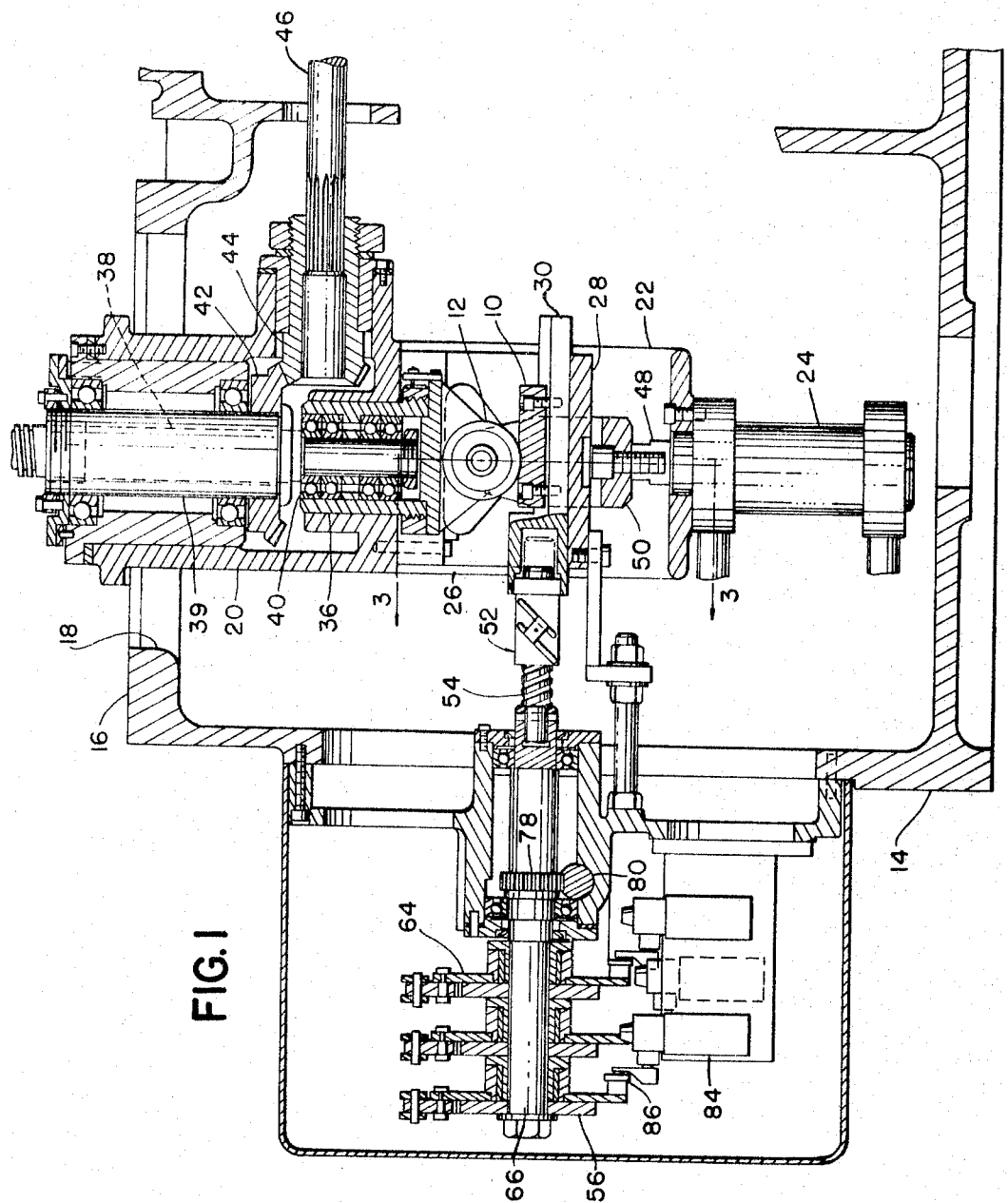
FIGURE 1 is a vertical sectional view through a machine illustrating the feeding mechanism applied thereto, taken on the line 1—1, FIGURE 2.

The present invention relates to feeding mechanism employing as means for producing accurately controlled feeding movement an inclined wedge or cam 10 associated with a cam follower in the form of a roller 12 engageable with the upper surface of the cam. As the cam is shifted horizontally to the right or left as seen in FIGURE 1, it will be apparent that the mechanism carrying the roller 12 is vertically movable.

Figure 3:
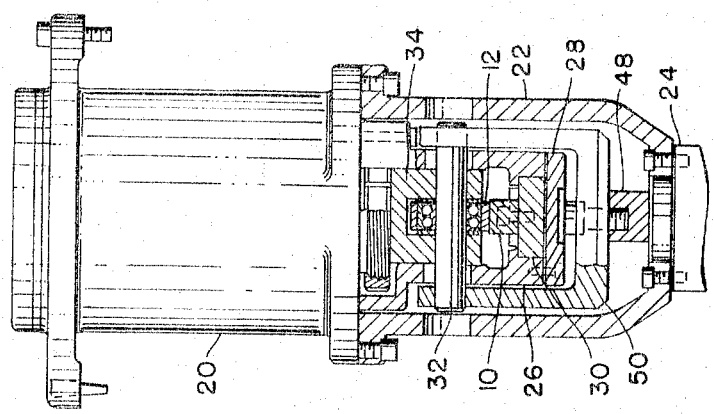
FIGURE 3 is a fragmentary sectional view on the line 3—3, FIGURE 1.
Figure 2:
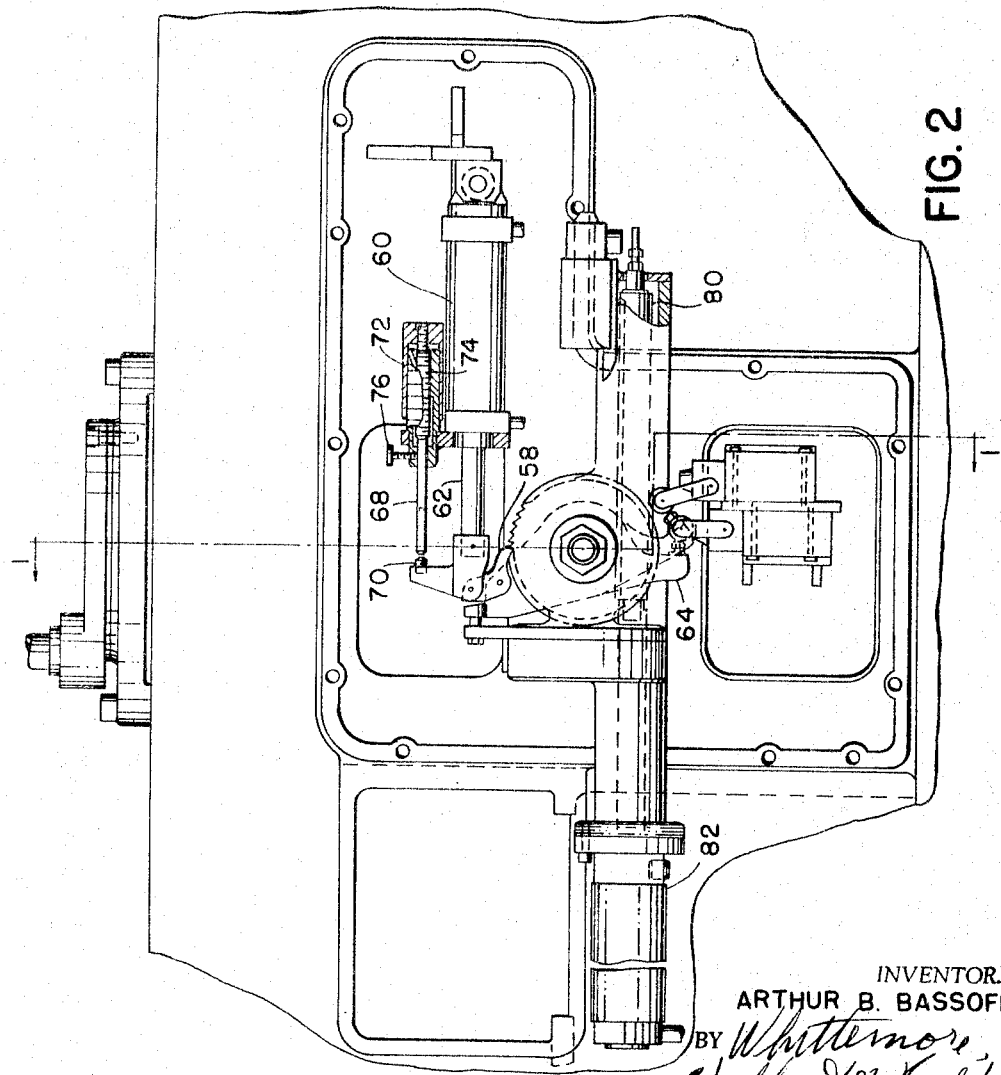
FIGURE 2 is a fragmentary end view of the machine shown in FIGURE 1.

Referring more generally to the machine, it comprises a frame 14 having an upper wall 16 provided with an opening 18 in which is fixedly mounted a shell 20 which as best seen in FIGURE 3 has bolted or otherwise fixedly secured thereto a secondary housing 22 which at its lower end carries a fluid piston and cylinder device 24.

Also fixedly secured to the underside of the shell 20 is a yoke 26 carrying a support plate 28 on which is movably mounted a slide 30 carrying the inclined cam or wedge 10. The roller 12 is rotatably mounted on a shaft 32, the shaft being received in the block 34 depending from the underside of a thrust bearing sleeve 36. The feed screw shaft 38 has a reduced lower end received in the bearings 40 and is vertically movable in a bearing sleeve 39 and keyed thereto against rotation.

Means are provided for effecting rotation of the feed screw 38 comprises bevel gears 42 and 44, the former connected to sleeve 39 and the latter being connected by a shaft 46 for remote actuation as by a hand wheel.

The cylinder device 24 contains a piston which actuates a piston rod 48 secured to the underside of a yoke 50. The upper ends of the yoke 50 are connected to the shaft 32 so that when power is applied to the cylinder 24 it provides a force tending to lift the roller 12 from the cam 10 and thus, to provide a major part of the support through the feed screw 38 to the mechanism carried thereby which for example may be a wheel supporting slide on a grinder.

Means are provided for effecting horizontal movement of the inclined cam 10 and this means comprises essentially a ball nut device 52 operable on a threaded shaft 54. The shaft 54 is connected to shaft 66 which carries a plurality of ratchet discs 56, three being illustrated in FIGURE 1. Each of the ratchet discs has a pawl 58 associated therewith and mechanism for effecting back and forth movement of the pawl. This mechanism comprises cylinders 60 having pistons therein connected to piston rods 62 adapted to oscillate the pawl carriers 64 about the axis of the shaft 66 which is fixed to the screw shaft 54. Means are provided for determining the length of stroke of the piston and this means comprises an adjustable abutment 68 adapted to be engaged by a stop 70 provided at the upper end of the pawl carrier. The adjustable abutment 68 may be adjusted by rotating the sleeve 72 which carries a threaded shaft 74 and the parts locked in position by a set screw 76.

The shaft 66 has a pinion 78 formed thereon which cooperates with a rack 80 so that as the screw shaft 54 is rotated incrementally, thus effecting incremental movements of the inclined cam 10, the rack 80 is moved in a first direction. After completion of the series of feeding movements, all of the pawls 58 are out of engagement with the ratchet discs and the shaft 66 and screw shaft 54 may be reversely rotated to starting position by movement of the rack by a piston and cylinder device 82.

The cycling of the machine may be controlled by suitable circuitry which includes counters 84 actuated by the pawl carriers 64.

From the foregoing it will be observed that means are provided for effecting extremely accurate feeding movements in a machine tool, dependent upon the inclination of the upper surface of the cam or wedge 10 and in part upon the angular spacing of the ratchet teeth. By employing a plurality of pawl and ratchet devices, such as the three shown herein, it is possible to obtain different rates or increments of feeding as for example, in rough grinding, semi-finishing grinding, and finally, in final finish grinding. The present feeding mechanism is intended to provide for vertically downward feeding movement accomplished by moving the inclined camming or wedging device in a direction to permit downward movement of the mechanism supported thereby. In returning the mechanism to initial position, power is admitted to the cylinder 24 to assist in raising the movable mechanism so that the entire lifting action need not be provided through the cam and the ball screw and nut device.

The drawings and the foregoing specification constitute a description of the improved feed mechanism in such full, clear, concise and exact terms as to enable any person skilled in the art to practice the invention, the scope of which is indicated by the appended claims.

What I claim as my invention is:

1. Feed mechanism for a machine tool comprising a fixed support, a cam movable horizontally on said support, a slidable member movable vertically toward and away from said support, roller means on said member engaging said cam, and power means for moving said cam, said power means comprising a ball screw and nut device and a plurality of pawl and ratchet devices connected to said ball screw and nut device for selective operation to effect different increments of feed, a single shaft to which all of the ratchet discs of said pawl and ratchet devices are connected, a pinion on said shaft, a rack connected to said pinion, and power means connected to said rack to return said ratchet discs to starting position.

2. A machine tool comprising a frame having a vertical shell therein, a vertically slidable member in said shell, a yoke suspended from said shell, a cam carried by said yoke beneath said member, a cam follower on said member, a threaded cam adjusting device connected between said frame and said cam, and pawl and ratchet actuating mechanism connnected to said device, a second yoke suspended from said shell, a power piston and cylinder assembly carried by said second yoke, and means connecting said assembly to said member to apply vertically upwardly acting force to said member.

3. A machine tool comprising a frame including a vertical guide, a member slidable vertically in said guide, a first yoke depending from said guide, a cam on said yoke below said member, a cam follower on said member, means for shifting said cam horizontally to effect vertical feeding of said member, in which the cam follower is a roller, a shaft carried by said member and supporting said roller, a second yoke depending from the ends of said shaft, and a piston and cylinder assembly connected to said second yoke to apply vertically upward force to said member.

4. A machine tool as defined in claim 3 comprising a third yoke suspended from said frame to which said piston and cylinder assembly is connected.

5. Feed apparatus comprising a frame, a horizontal guideway on said frame, a cam movable on said guideway having an inclined upper surface, a member slidable vertically on said frame above said cam, a roller connected to said member and resting on said track, power means for effecting incremental movement of said cam to provide for vertical movement of said member, said power means comprising relatively rotatable threaded elements connected between said frame and said cam, and pawl and ratchet mechanism connected to one of said elements to rotate said one element incrementally, a pinion on said one element, a rack movable on said frame and in mesh with said pinion, and power means connected to said rack to effect reverse rotation of said one element to return said member to starting position.

6. Apparauts as defined in claim 5, and a fluid piston and cylinder assembly connected to said member to apply vertical lifting force thereto.

7. In a machine tool a frame, a vertical feed screw in said frame for cooperation with a nut on a machine tool component which is to be vertically fed in a plurality of incremental feed movements and thereafter returned to initial position, a rotatable sleeve in said frame, means supporting said sleeve against vertical movement, said screw being keyed to said sleeve for rotation therewith and slidable vertically therein, a thrust bearing connected to the lower end of said screw, cam mechanism including a movable cam surface supporting said thrust bearing, means for rotating said sleeve to rotate said screw, means for effecting repeated incremental adjustment of said cam mechanism in one direction, additional means for effecting reverse movement of said cam mechanism in one continuous movement in the opposite direction to restore said thrust bearing and screw to initial position.

8. Mechanism as defined in claim 7 in which the means for effecting repeated incremental adjustment of said cam mechanism comprises rotary threaded means connected between said frame and cam mechanism, a plurality of independently selectively operable pawl and ratchet devices connected to said threaded means, and rack and pinion mechanism connected to said threaded means.

9. Mechanism as defined in claim 7 comprising piston and cylinder mechanism connected between said frame and said thrust bearing to apply vertical upward force to said thrust bearing.

References Cited by the Examiner

UNITED STATES PATENTS

| 1,348,851 | 8/1920 | Cook. | |
| 1,771,907 | 7/1930 | Abramson | 74—110 X |
| 2,481,648 | 9/1949 | Dehn | 74—110 X |
| 2,808,729 | 10/1957 | Saives | 74—128 |
| 2,829,530 | 4/1958 | Holden | 74—128 |
| 3,112,654 | 12/1963 | Baumann | 74—110 |
| 3,187,601 | 6/1965 | Glenn | 74—424.8 |

OTHER REFERENCES

Product Engineering, "Accelerated and Decelerated Linear Motion Elements," by J. E. Hyler, January 1938, pages 28–29.

MILTON KAUFMAN, *Primary Examiner.*

FRED C. MATTERN, *Examiner.*

D. H. THIEL, *Assistant Examiner.*